Figures 1, 2, 3:
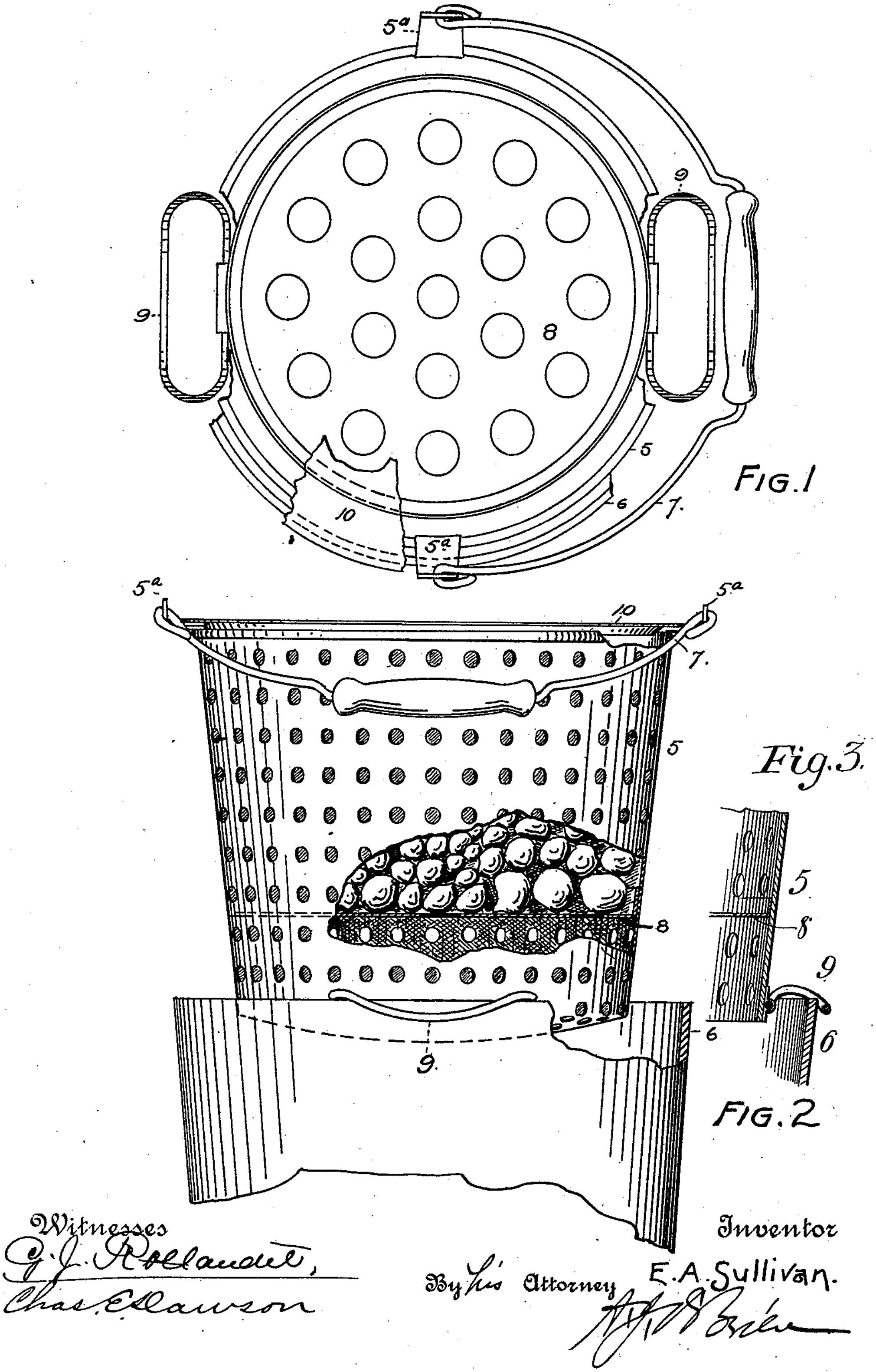

(No Model.)

E. A. SULLIVAN.

COOKING UTENSIL.

No. 568,465. Patented Sept. 29, 1896.

Witnesses
G. J. Rollandet,
Chas. E. Dawson

Inventor
E. A. Sullivan.
By his Attorney
[signature]

THE NORRIS PETERS CO., PHOTO-LITHO., WASHINGTON, D. C.

UNITED STATES PATENT OFFICE.

EUGENE A. SULLIVAN, OF DENVER, COLORADO.

COOKING UTENSIL.

SPECIFICATION forming part of Letters Patent No. 568,465, dated September 29, 1896.

Application filed November 11, 1895. Serial No. 568,657. (No model.)

*To all whom it may concern:*

Be it known that I, EUGENE A. SULLIVAN, a citizen of the United States of America, residing at Denver, in the county of Arapahoe and State of Colorado, have invented certain new and useful Improvements in Cooking Utensils; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates generally to cooking utensils and specifically to pot-strainers.

The invention consists, briefly stated, of a perforated receptacle provided with a detachable perforated plate and gripping handles hinged to its lower portion exteriorly. When the perforated plate is employed, the utensil becomes a combined pot-strainer and steamer. The gripping-handles are adapted to engage the top of the pot and support the device and its contents thereon when the strainer is lifted out of the water. When the strainer is lowered into the pot, the handles fold up against the sides thereof, being longitudinally curved to fit the outer wall of the strainer.

The invention will be fully understood by reference to the accompanying drawings, in which is illustrated an embodiment thereof.

In the drawings, Figure 1 is a top or plan view of the device. Fig. 2 is a side elevation thereof, the wall being partly broken away on one side. This figure also shows the pot upon which the strainer is supported by means of the gripping-handles. Fig. 3 is a fragmentary section taken through the strainer, one of its gripping-handles, and the outer vessel.

Similar reference-characters indicate corresponding parts in the views.

Let the numeral 5 designate the strainer, being a perforated receptacle adapted to set into a pot 6 and having the general shape of the pot with which it is used. To the top of the strainer is hinged a suitable bail 7. When it is desired to use the strainer as a steamer, a perforated disk or plate 8 is employed. The size of the plate is so regulated that it is supported a considerable distance above the bottom of the strainer, leaving a space below the plate for the water. The vegetables (or other food to be cooked) are placed upon this plate 8, whereby they are supported above the water in the pot.

To the outside of the strainer and to the lower portion thereof are hinged two handles 9, which are curved longitudinally or in the direction of the circumference of the strainer. This curve allows the upper edge of the pot to enter the handles sufficiently to enable the latter to grip the pot and support the strainer thereon after its contents are cooked, or when for any other reason it is desirable or necessary to lift the strainer out of and support it upon the pot.

The strainer 5 is provided with laterally-projecting ears $5^a$, which overlap the upper edge of the pot and to which the bail is attached. The cover 10 of the strainer is large enough to cover the pot also, whereby the steam is prevented, as nearly as possible, from escaping.

From the foregoing description the use of the strainer will be readily understood. The vegetables (or other food to be boiled) are placed in the strainer and into a pot containing the necessary water for the purpose. If it is desired to cook the food by steaming, the perforated disk 8 is employed, and the food is supported upon the disk and above the water, so the steam only comes in contact therewith. After the food is cooked the strainer is lifted out of the pot and the handles 8 drop to engagement with the top of the pot and support the strainer thereon, whereby the food is kept warm until it is put upon the table.

Having thus described my invention, what I claim is—

As an improved article of manufacture, the pot-strainer herein described, comprising the perforated receptacle having a suitable lifting-bail, and the gripping-handles hinged to the strainer and curved longitudinally to fit the convex surface of the strainer when folded against the same, and adapted to grip the upper edge of the pot when thrown outwardly from the surface of the strainer, as and for the purpose set forth.

In testimony whereof I affix my signature in the presence of two witnesses.

EUGENE A. SULLIVAN.

Witnesses:

CHAS. E. DAWSON,

ALFRED J. O'BRIEN.